United States Patent [19]

Isozaki

[11] Patent Number: 4,605,446

[45] Date of Patent: Aug. 12, 1986

[54] PROCESS FOR PREPARING ORGANOSILICON HIGH CONDENSATION PRODUCTS

[75] Inventor: Osamu Isozaki, Yokohama, Japan

[73] Assignee: Kansai Paint Company, Limited, Japan

[21] Appl. No.: 777,551

[22] Filed: Sep. 16, 1985

Related U.S. Application Data

[63] Continuation of Ser. No. 556,954, Dec. 1, 1983, abandoned.

[51] Int. Cl.$^4$ .................... C09K 3/00; C08G 77/04
[52] U.S. Cl. ........................ 106/287.12; 106/287.16
[58] Field of Search ............... 528/33, 34; 106/287.16, 106/38.2, 38.35, 287.12

[56] References Cited

U.S. PATENT DOCUMENTS

| | | | |
|---|---|---|---|
| 2,618,570 | 11/1952 | Blackburn | 106/287.16 |
| 2,842,445 | 7/1958 | Emblem | 106/287.16 |
| 3,232,771 | 2/1984 | Pearce | 106/38.35 |
| 3,389,114 | 6/1968 | Burzynski et al. | 523/309 |
| 4,308,371 | 12/1981 | Tanaka et al. | 528/18 |

Primary Examiner—Theodore Morris
Attorney, Agent, or Firm—Larson and Taylor

[57] ABSTRACT

A process for preparing an organosilicon high condensation product having no silanol group in the terminal of the molecule, the process comprising the steps of hydrolyzing a mixture of an organosilicon compound represented by the formula (A)

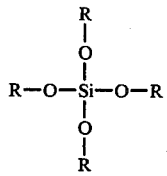

wherein R represents a hydrocarbon group having 1 to 8 carbon atoms and/or a low condensation product thereof and an organosilicon compound represented by the formula (B)

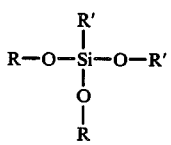

wherein R' represents a hydrocarbon group having 1 to 12 carbon atoms and R is as defined above and/or a low condensation product thereof in the presence of an acid catalyst, and adding an alkaline material to the reaction product to adjust its pH to more than 7, thereby causing condensation reaction.

7 Claims, No Drawings

PROCESS FOR PREPARING ORGANOSILICON HIGH CONDENSATION PRODUCTS

This application is a continuation of application Ser. No. 556,954 filed 12-1-85, now abandoned.

The present invention relates to a process for preparing organosilicon high condensation products, and more particularly to a process for preparing organosilicon high condensation products having no terminal silanol group.

Organosilicon condensation products find wide use in various applications. For example, many proposals have been made to use such products for coating compositions containing silicate as a film-forming component. Well-known coating compositions of this type iclude alkylsilicate-type zinc-rich coating compositions, alkali silicate-type zinc-rich coating compositions and like anticorrosive coating compositions; polydimethyl siloxane and like organosilicon-type heat resistant coating compositions; etc.

Alkylsilicate-type zinc-rich coating compositions can be prepared by hydrolyzing an organosilicon compound of the formula (A)

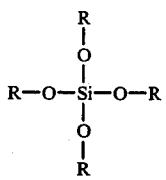
(A)

(wherein R represents a hydrocarbon group having 1 to 8 carbon atoms) and/or a low condensation product thereof in the presence of a hydrochloric acid or like acid catalyst, subjecting the reaction product to partial condensation reaction to provide a product serving as a binder and adding a large amount of zinc powder to the binder. The binder thus obtained has numerous terminal silanol groups formed by the hydrolysis and these silanol groups are metastable with a pH in the acidic level. Zinc powder is added to the binder before use to consume the acid catalyst and to react with the binder so that the coating film formed is cured by cross linking. The progress of the condensation reaction varies with the amount of water used and other reaction conditions, and the condensation reaction using the acid catalyst (with a pH in the acidic level) can not give a high condensation product. Before adding zinc powder, the resulting condensation product, when stored for 3 to 6 months, tends to exhibit deteriorated stability and increased viscosity and to gel. A coating composition comprising such binder as a film-forming component and zinc powder has a pot life of about 5 to about 10 hours and is cured by the reaction between the zinc powder and the silanol groups in the binder. Accordingly a coating composition incorporating an unreactive common pigment in place of zinc powder can not give a coating film having a thickness of more than 1μ and the coating is markedly poor in performance and unsuitable for practical use.

Japanese Unexamined Patent Publication No. 116761/1981 discloses a one-package-type zinc-rich coating composition comprising a low condensation product of alkylsilicate and a moisture curing auxiliary such as alkyltitanate or alkylzirconate. The curing reaction of the above coating composition generates a large amount of alcohol as a by-product which reduces the volume on evaporation. For this reason, the disclosed coating composition is difficult to use without incorporating a considerable amount of zinc powder and is not usable as a clear coating composition or as a coating composition intended to form thick coatings.

Clear coating compositions containing as a binder polydimethyl siloxane or like organosilicon resin, and zinc-free enamel or like inorganic coating compositions, all of moisture curing type, heretofore developed find limited applications because due to numerous alkyl groups present in the binder the coating compositions lack a high heat resistance, give a coating film having a low cohesive strength and involve difficulty in forming a coating of another coating composition thereover.

It is an object of the present invention to provide a process for preparing a high condensation product of organic silicon having no silanol group in the terminals of the molecule.

It is another object of the invention to provide a process for preparing an organosilicon high condensation product having no silanol group in the terminals of the molecule which product, when used as a film-forming component for a coating composition, is superior in film-forming ability and particularly in resistances to corrosion, solvents, heat and weather to conventional silicate coating compositions.

Other objects and features of the present invention will become apparent from the following description.

We have conducted research to develop a silicon-containing coating composition of the above-mentioned type free from the foregoing drawbacks and found that a high condensation product having no silanol group in the terminals of the molecule can be prepared by hydrolyzing a mixture of an organosilicon compound of the above-mentioned formula (A) and/or a low condensation product thereof and an organosilicon compound of the formula (B)

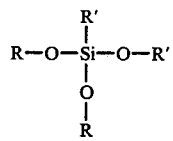
(B)

(wherein R' represents a hydrocarbon group having 1 to 12 carbon atoms and R is as defined above) and/or a low condensation product thereof in the presence of an acid catalyst and subjecting to condensation reaction the resulting reaction product with its pH adjusted to over 7 and that a coating composition comprising the condensation product thus obtained gives a coating film with outstanding physical properties curable by the moisture in air when applied to an article to be coated and can overcome the foregoing defects of the prior art coating compositions. The present invention has been accomplished based on these novel findings. More specifically stated, the present invention provides a process for preparing an organosilicon high condensation product having no silanol group in the terminals of the molecule, the process comprising the steps of hydrolyzing a mixture of an organosilicon compound represented by the formula (A).

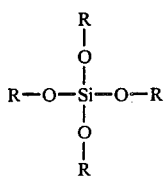

(A)

(wherein R represents a hydrocarbon group having 1 to 8 carbon atoms) and/or a low condensation product thereof and an organosilicon compound represented by the formula (B).

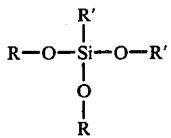

(wherein R' represents a hydrocarbon group having 1 to 12 carbon atoms and R is as defined above) and/or a low condensation product thereof in the presence of an acid catalyst, and adding an alkaline material to the reaction product to adjust its pH to more than 7, thereby causing condensation reaction.

R in the organosilicon compound of the formula (A) to be used as the starting material in the present process represents hydrocarbon groups having 1 to 8 carbon atoms which are the same or different, such as methyl, ethyl, propyl, hexyl and like alkyl groups; phenyl, tolyl, xylyl, and like aryl groups; cyclohexyl, cyclobutyl, cyclopentyl and like cycloalkyl groups; etc. Examples of useful organosilicon compounds of the formula (A) are tetramethoxy silane, tetraethoxy silane, tetrapropioxy silane, tetrabutoxy silane, tetraphenoxy silane, etc. The lower condensation product thereof is an oligomer having a degree of polymerization of less than 10.

The groups represented by R in the organosilicon compound of the formula (B) are the same as those of R in the compound of the formula (A). The groups R' in the compound of the formula (B) are hydrocarbon groups having 1 to 12 carbon atoms and bonded to the silicon by the carbon-silicon bonding, such as methyl, ethyl, propyl, hexyl, octyl, and like alkyl groups; phenyl, tolyl, xylyl, naphthyl and like aryl groups; cyclohexyl, cyclobutyl, cyclopentyl and like cycloalkyl groups; etc.

Examples of useful organosilicon compounds of the formula (B) are methyltrimethoxy silane, methyltriethoxy silane, phenyltrimethoxy silane, phenyltriethoxy silane, etc.

According to the present invention, the mixture of the organosilicon compounds of the formulae (A) and (B) and/or the lower condensation products thereof is added to a water-soluble solvent such as alcohol-type, Cellosolve-type, Cellosolve acetate-type, glyme-type or like solvent and then water is added in an amount of 0.2 to 2 moles per mole of the RO group bonded to the Si group in the presence of a mineral acid such as hydrochloric acid, sulfuric acid or phosphoric acid or an organic acid such as formic acid or acetic acid, preferably at a pH of less than 6 to subject the resulting mixture to hydrolysis and partial condensation with stirring at about 20° C. to about 100° C. for about 0.5 to about 10 hours. Subsequently condensation reaction is continued for 0.5 to 10 hours on adjustment of the pH of the reaction product to over 7, preferably 7.5 to 8.5, by adding an alkaline material such as sodium hydroxide, potassium hydroxide or like inorganic base; sodium borate, sodium molybdate or like alkali metal salt or alkaline earth metal salt or boric acid, molybdic acid or like weak acid which is basic and soluble in a watersoluble solvent; monoethylamine, diethylamine, triethylamine or like aliphatic amine; ammonia; etc. After the completion of the reaction, the water remaining in the reaction product is removed by azeotropic or like distillation or other conventional means, whereby a desired organosilicon high condensation product can be easily produced.

In preparing a desired high condensation product, each of the compounds of the formulae (A) and (B) is used in an amount of 5 to 95%, preferably 20 to 80%, by weight.

When using less than 5% by weight of the compound of the formula (A) or over 95% by weight of the compound of the formula (B), the high condensation product obtained results in the production of an inorganic coating film with impaired curability and deteriorated ability to form a coat of another coating composition thereover. With less than 5% by weight of the compound of the formula (B) or over 95% by weight of the formula (A), a thick coating film produced by their use would be likely to crack or to peel off.

The process of the present invention gives a three-dimensional condensation product having a degree of condensation of at least 20 and a molecular weight of about over 3000. The present high condensation product has such satisfactory properties as an inorganic binder for coating compositions that for example, its use for a clear coating composition can produce a coating film about 50 to about 100μ in thickness. The coating film is cured by the moisture in air about 10 minutes to about 10 hours after application, and can be rapidly hardened in several minutes on contact with water after application. The curability can be improved by adding a strongly basic catalyst or an alkoxide of metal such as titanium, aluminium or the like.

The present organosilicon high condensation product has no terminal silanol group susceptible to condensation reaction and thus is outstanding in storage stability. The absence of the terminal silanol group can be substantiated, for example, by the fact that the present condensation product even as combined with zinc powder is free from gellation after a long period of storage. The cross linking density can be appropriately adjusted by varying the amounts of tetraalkoxy silane and trialkoxy silane contained in the present condensation product. As a result, an inorganic coating film can be produced with a well balanced combination of curability and ability to produce a thick coat, or namely without any crack or gellation during curing and for example, with a thickness of 50 to 100μ, even when used for a clear coating composition. Further since the skeleton is formed mainly of -Si-O-Si-bond, the cured coating film is excellent in resistances to heat, corrosion, chemicals and weather.

The present organosilicon high condensation product can be made into a one-package-type anticorrosive coating composition by incorporating zinc powder or like metal powder, or into an enamel by adding an extender or coloring pigment. The use of such pigment in a large amount can provide a coating film over 100μ in thickness without causing any crack or gellation.

The inorganic coating film produced from the present organosilicon high condensation product having no terminal silanol group is superior in performance and particularly in resistances to corrosion, solvents, heat and weather to the conventional silicate coatings.

The present invention will be described below in more detail with reference to the following Examples and Comparison Examples.

EXAMPLE 1

Into a reactor were placed 62 g of tetraethoxy silane, 125 g of methyltriethoxy silane and 187 g of ethyl alcohol. The contents were heated to 80° C. with stirring and 30 g of a 0.2 N-hydrochloric acid solution was added to react at 80° C. for 10 hours. To the reaction mixture was added 30 g of triethylamine to increase the pH to over 7, thereby effecting condensation reaction at 80° C. for 2 hours. After adding 100 g of benzene, the removal of the solvent was continued until the content of involatile components was increased to 40% (by weight, the same hereinafter).

The reaction product thus obtained (varnish) was transparent and had a viscosity of 5.8 cP. After storage for 2 months at 30° C., the product was found not to have increased viscosity or gelled, and thus evidently had an excellent storage stability.

The above varnish was applied to a polished mild steel panel to form a 50µ-thick coating film and left to stand in a chamber at a temperature of 20° C. and a relative humidity of 75% for 7 days. Thereafter the panel with the coating was checked to find that no crack or any other undesired phenomenon occurred. The coated panel was also tested for resistance to sprayed salt according to JIS Z 2371 with the result of no rust spot observed 7 days after the test.

EXAMPLE 2

Into a reactor were placed 132 g of tetrabutoxy silane, 138 g of phenyltributoxy silane and 270 g of butyl alcohol. The contents were heated to 100° C. with stirring and then 66 g of a 5% aqueous solution of formic acid was added to react at 100° C. for 1 hour. To the reaction mixture was added 30 g of N-methylmorpholine to increase the pH to over 7, thereby effecting condensation reaction at 90° C. for 2 hours. After adding 100 g of toluene, the removal of the solvent was continued until the content of involatile components was increased to 40%.

The reaction product thus obtained (varnish) was transparent and was found to have a viscosity of 28.0 cP and to exhibit outstanding storage stability which results in no increase of viscosity nor gellation after storage for 2 months at 30° C.

A coating composition comprising the above varnish and titanium oxide dispersed therein in a ratio of 100 PHR was applied to a polished mild steel panel to produce a 100µ-thick coating film. The panel with the coating film was left to stand in a chamber at a temperature of 20° C. and a relative humidity of 75% for 7 days. No crack or other abnormal phenomenon was observed on the coating film. Test for resistance to sprayed salt was conducted according to JIS Z 2371 with the result of no rust spot found on the coating 15 days after the test.

EXAMPLE 3

Into a reactor were placed 427 g of ES-40 (trade name, low condensation product of tetraethoxy silane produced by Nihon Colcoat Co., Ltd.), 58 g of ethyltriethoxy silane and 300 g of ethyl alcohol. The contents were heated to 80° C. with stirring and 142 g of a 0.2 N-hydrochloric acid solution to react at 80° C. for 3 minutes. To the reaction mixture was added 5 g of potassium hydroxide to increase the pH to over 7, thereby conducting condensation reaction at 80° C. for 2 hours. After adding 200 g of benzene, the removal of the solvent was continued until the content of involatile components was increased to 30%.

The reaction product thus obtained (varnish) was transparent and was found to have a viscosity of 11.2 cP and to exhibit an outstanding storage stability which was established by a 2-month storage test at 30° C. which involved no increased viscosity or gellation.

A coating composition comprising the above varnish and zinc powder dispersed therein in a ratio of 300 PHR was applied to a sand-blasted steel panel to produce a 100 µ-thick coating film and the panel with the coating film was set in a chamber at a temperature of 20° C. and a relative humidity of 75% for 7 days. The coated panel was found to have no crack nor undesired phenomenon on the coating film. After immersion in seawater at 40° C. for 3 months, no rust spot was discovered over the coating film. A coating composition comprising the varnish and zinc powder was recorded not to have gelled after 7 days of storage at 50° C.

COMPARISON EXAMPLE 1

Into a reactor were placed 208 g of tetraethyl silicate, 208 g of ethyl alcohol and 72 g of a 0.2 N-hydrochloric acid solution. The contents were stirred to react at 40° C. for 2 hours. To the reaction mixture was added 50 g of triethylamine to increase the pH to more than 7 and condensation reaction was conducted. After adding 50 g of benzene, the removal of the solvent was continued until the amount of involatile components were increased to 40%. The product thus obtained displayed no change after 2 months of storage at 30° C. to prove its possession of good storage stability.

The product was applied to a polished mild steel panel to form a 50 µ-thick coating film. The coated panel was set in an chamber at a temperature of 20° C. and a relative humidity of 75% for 7 days whereafter small cracks were seen over the coating film. On the other hand, a 10 µ-thick coating film formed from the same product created no crack nor rust spot 2 days after sprayed salt resistance test.

COMPARISON EXAMPLE 2

To a polished mild steel panel was applied a coating composition with titanium dispersed in 100 PHR ratio in a portion of the reaction product obtained before the addition of N-methylmorpholine in Example 2, thereby forming a 100 µ-thick coating film over which large cracks appeared 10 minutes later. The same reaction product was found to have gelled after 15 days of storage at 50° C.

COMPARISON EXAMPLE 3

A coating composition with zinc powder added in 300 PHR to a portion of the reaction product obtained before incorporating potassium hydroxide in Example 3 was applied to a sand-blasted steel panel to form a 100 µ-thick coating film and the coated panel was set in a chamber at a temperature of 20° C. and a relative humidity of 75% for 7 days with the test result of no abnormal phenomenon observed. No rust spot was found after 3 months of immersion in seawater at 40° C.

The varnish containing zinc powder gelled at 20° C. in 6 hours and the varnish without zinc powder incorporated was found to have increased viscosity and to have gelled after 5 day- storage test at 50° C.

I claim:

1. A process for preparing an organosilicon high condensation product having no silanol group in the terminal of the molecule the process comprising the two steps of (i) hydrolyzing a mixture of 5 to 95% by weight of an organosilicon compound represented by the formula (A)

$$R-O-\underset{\underset{R}{\overset{\overset{R}{|}}{\overset{|}{O}}}}{\overset{\overset{R}{\overset{|}{O}}}{Si}}-O-R$$

wherein R is $C_1$-$C_4$ alkyl and 5 to 95% by weight of an organosilicon compound represented by the formula (B)

$$R'Si(OR)_3$$

wherein R' is methyl, ethyl or phenyl and R is $C_1$-$C_4$ alkyl in the presence of an acid catalyst at a pH of less than 6 at 20° C. to 10° C. for 0.5 to 10 hours and with the addition of 0.2 to 2 moles of water per mole of the RO group bonded to the Si group, and (ii) causing condensation reaction for 0.5 to 10 hours by adding an alkaline material to the reactin product to adjust its pH to 7 to 8.5.

2. A process as defined in claim 1 in which the compound of the formula (B) is methyltrimethoxy silane, methyltriethoxy silane, ethyltriethoxy silane, phenyltrimethoxy silane, phenyltriethoxy silane or phenyltributoxy silane.

3. A process as defined in claim 1 wherein the compound of the formula (A) is tetramethoxy silane, tetraethoxy silane, tetrapropioxy silane or tetrabutoxy silane.

4. A process as defined in claim 1 in which the acid catalyst is a mineral acid or organic acid.

5. A process as defined in claim 1 in which the alkaline material is an inorganic base, alkali metal salt or alkaline earth metal salt of weak acid, aliphatic amine or ammonia.

6. A process as defined in claim 1 wherein the compound of the formula (A) is tetraethoxy siline or tetrabutoxy silane.

7. A process as defined in claim 1 in which the alkaline material is added to the hydrolyzing reaction product to adjust its pH to 7.5 to 8.5.

* * * * *